US00RE43543E

(19) United States
(12) Reissued Patent
Frantti et al.

(10) Patent Number: US RE43,543 E
(45) Date of Reissued Patent: Jul. 24, 2012

(54) ESTIMATION OF MOVEMENT

(75) Inventors: Tapio Frantti, Oulu (FI); Petri Mähönen, Aachen (DE)

(73) Assignee: Intellectual Ventures Holding 9 LLC, Carson City, NV (US)

(21) Appl. No.: 12/218,972

(22) Filed: Jul. 18, 2008

Related U.S. Patent Documents

Reissue of:

(64) Patent No.: 7,079,814
Issued: Jul. 18, 2006
Appl. No.: 10/311,234
PCT Filed: Jun. 14, 2001
PCT No.: PCT/FI01/00562
§ 371 (c)(1),
(2), (4) Date: Apr. 23, 2003
PCT Pub. No.: WO01/99447
PCT Pub. Date: Dec. 27, 2001

(30) Foreign Application Priority Data

Jun. 19, 2000 (FI) ..... 20001453

(51) Int. Cl.
*H04B 17/00* (2006.01)

(52) U.S. Cl. ..... 455/67.11; 455/423; 455/67.13; 455/63.1; 455/69; 455/441; 455/67.16; 455/422.1; 375/272; 375/269; 375/219; 342/357.31; 342/357.1; 342/357.35; 342/357.08; 342/357.13

(58) Field of Classification Search ..... 455/67.11, 455/423, 63.1, 441, 404.2, 456.1, 67.16, 455/522, 67.13; 375/272, 219, 269; 370/337, 370/347, 465; 342/357.1, 104, 106
See application file for complete search history.

(56) References Cited

U.S. PATENT DOCUMENTS 5,513,221 A * 4/1996 Parr et al. ..... 375/344
5,862,487 A 1/1999 Fujii et al.
5,894,473 A * 4/1999 Dent ..... 370/342
5,953,677 A 9/1999 Sato
6,035,209 A 3/2000 Tiedemann, Jr. et al.
6,067,460 A * 5/2000 Alanara et al. ..... 455/574
6,078,826 A 6/2000 Croft et al.
6,219,540 B1 4/2001 Besharat et al.
6,225,948 B1 * 5/2001 Baier et al. ..... 342/417
6,249,252 B1 * 6/2001 Dupray ..... 342/450
6,275,705 B1 * 8/2001 Drane et al. ..... 455/456.2
6,297,773 B1 * 10/2001 Fullerton et al. ..... 342/457
6,313,787 B1 * 11/2001 King et al. ..... 342/357.42
6,314,308 B1 11/2001 Sheynblat et al.
6,317,612 B1 * 11/2001 Farsakh ..... 455/67.11
6,370,357 B1 * 4/2002 Xiao et al. ..... 455/67.11
6,385,460 B1 5/2002 Wan
6,396,867 B1 * 5/2002 Tiedemann et al. ..... 375/141
6,456,827 B1 * 9/2002 Kubo et al. ..... 455/68
6,480,716 B2 * 11/2002 Salonaho ..... 455/441

(Continued)

FOREIGN PATENT DOCUMENTS

EP 0 812 119 12/1997
EP 0 812 119 A2 12/1997
EP 0 833 537 4/1998
EP 0 833 537 A2 4/1998
GB 2 183 117 5/1987

(Continued)

OTHER PUBLICATIONS

Japanese Patent Office, English Translation of Office Action mailed Dec. 13, 2010 for Japanese Pat. App. No. 2002-504165.

(Continued)

*Primary Examiner* — Marceau Milford

(57) ABSTRACT

A mobile transceiver and a method of detecting movement of the mobile transceiver in a radio system. The radio system includes at least one base station and terminals. The movement of the mobile transceiver is measured by at least one acceleration sensor (114-116) to take the movement of the mobile transceiver onto account in the operation of the radio system.

42 Claims, 3 Drawing Sheets

U.S. PATENT DOCUMENTS

| | | | | |
|---|---|---|---|---|
| 6,496,695 | B1 | 12/2002 | Kouji et al. | |
| 6,542,741 | B2 | 4/2003 | Wallstedt et al. | |
| 6,542,745 | B1 * | 4/2003 | Mottier et al. | 455/441 |
| 6,564,042 | B1 * | 5/2003 | Jou et al. | 455/238.1 |
| 6,680,967 | B1 * | 1/2004 | Westman | 375/148 |
| 6,690,679 | B1 | 2/2004 | Turunen et al. | |
| 2001/0010686 | A1 | 8/2001 | Kubo et al. | |

FOREIGN PATENT DOCUMENTS

| | | | |
|---|---|---|---|
| GB | 2 183 117 | A | 5/1987 |
| GB | 2 305 825 | | 4/1997 |
| GB | 2 305 825 | A | 4/1997 |
| JP | 05-259969 | | 10/1993 |
| JP | 06-208696 | | 7/1994 |
| JP | 08-322091 | | 12/1996 |
| JP | 09-83409 | | 3/1997 |
| JP | 09-200827 | | 7/1997 |
| WO | WO 00/11798 | | 3/2000 |

OTHER PUBLICATIONS

Japanese Patent Office, Office Action mailed Jul. 19, 2010 for Japanese Pat. App. No. 2002-504165.

Communication from the European Patent Office for EP Application 01 945 364.6, dated Jan. 13, 2011.

International Preliminary Examination Report on PCT/FI01/00562, completed Sep. 27, 2002.

International Search Report on PCT/FI01/00562, mailed Sep. 26, 2001.

Frank, Randy, "Understanding Smart Sensors," 1996, Artech House.

Frantti, Tapio , "Fuzzy Power Control for Mobile Radio Systems," European Symposium on Applications of Intelligent Technologies, Aachen, Germany, 1997, pp. 1-6.

Viterbi, Andrew J. , "CDMA, Principles of Spread Spectrum Communication," Addison Wesley, 1995.

Tuulari, Esa, "Context Aware Hand-Held Devices," Technical Research Centre of Finland, 2000.

Randy Frank, *Understanding Smart Sensors*, 1996, Artech House.

Tapio Frantti, "Fuzzy Power Control for Mobile Radio Systems," European Symposium on Applications of Intelligent Technologies, Aachen, Germany, 1997, pp. 1-6.

Andrew J. Viterbi, "CDMA, Principles of Spread Spectrum Communication," Addison Wesley, 1995.

Esa Tuulari, *Context Aware Hand-Held Devices*, Technical Research Centre of Finland, 2000.

* cited by examiner

ESTIMATION OF MOVEMENT

Matter enclosed in heavy brackets [ ] appears in the original patent but forms no part of this reissue specification; matter printed in italics indicates the additions made by reissue.

*CROSS-REFERENCE TO RELATED APPLICATIONS*

*The present application is a reissue of U.S. patent application Ser. No. 10/311,234 (now U.S. Pat. No. 7,079,814), filed Apr. 23, 2003, which is a national stage filing of International Pat. App. No. PCT/FI01/00562, filed Jun. 14, 2001, which claims the benefit of Finnish Pat. App. No. 20001453, filed Jun. 19, 2000.*

FIELD OF THE INVENTION

The invention relates to a solution for detecting movement of a mobile transceiver in a radio system.

BACKGROUND OF THE INVENTION

In radio systems, such as the GSM (Global System for Mobile Communication), CDMA (Code Division Multiple Access), WCDMA (Wide Band CDMA), CDMA 2000, PDC (Personal Digital Cellular) and the like, the movement of a mobile terminal is not usually measured in any way but the operations of the whole radio system are designed so that the data transmission connection works in all conditions. In that case operations are performed as if the terminal moved all the time at a very high rate on the border of the coverage area of two or more base stations in a city during daytime. Consequently, the loading of base stations and the interference level are high and channel changes as great as possible. This wastes resources and power, and increases the interference level because several measuring and signalling operations are performed all too often with respect to what the real movement of the terminal requires.

BRIEF DESCRIPTION OF THE INVENTION

The object of the invention is to improve estimation of movement and adjust the operations of a radio system to the movement. This is achieved with a method of detecting movement of a mobile transceiver in a radio system, which comprises at least one base station and terminals. The method further comprises measuring the movement of the mobile transceiver by at least one acceleration sensor to take the movement of the mobile transceiver into account in the operation of the radio system.

The invention also relates to a mobile transceiver in a radio system, which comprises at least one base station and terminals. The mobile transceiver is further arranged to measure its movement with at least one acceleration sensor to take the movement of the mobile transceiver into account in the operation of the radio system.

The method and system of the invention provide several advantages. The power consumption of the mobile transceiver can be reduced, the radio network capacity increased and the quality of data transmission improved.

BRIEF DESCRIPTION OF THE DRAWINGS

The invention will now be described in greater detail by means of preferred embodiments with reference to the accompanying drawings, in which.

DETAILED DESCRIPTION OF THE INVENTION

Figure 1:
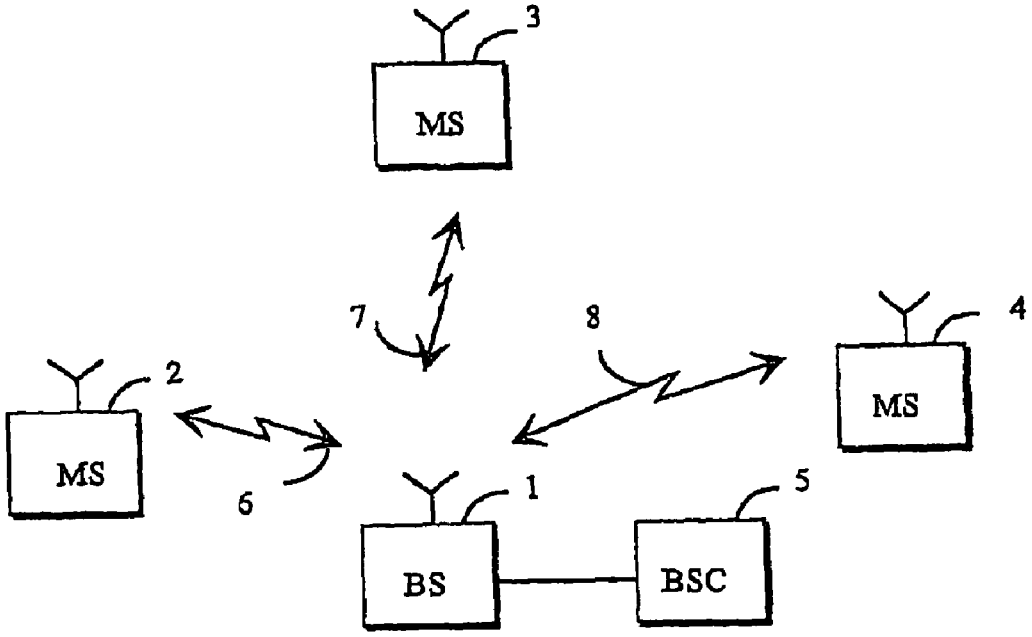
FIG. 1 is a block diagram illustrating a radio system.

The solution of the invention is applicable to a mobile transceiver of a radio system, in particular.

First the radio system will be described by means of FIG. 1. A typical digital radio system comprises a base station 1, mobile transceiver units 2 to 4 and a base station controller 5. The base station 1 communicates with mobile transceiver units 2 to 4 using signals 6 to 8. The base station 1 is connected to the base station controller 5 by a digital transmission link 9. The mobile transceiver units 2 to 4 are terminals, e.g. mobile stations. The signals 6 to 8 between the base station 1 and the mobile transceivers 2 to 4 include digitised information which is e.g. speech or data information produced by subscribers or control information produced by the radio system.

Figure 2:
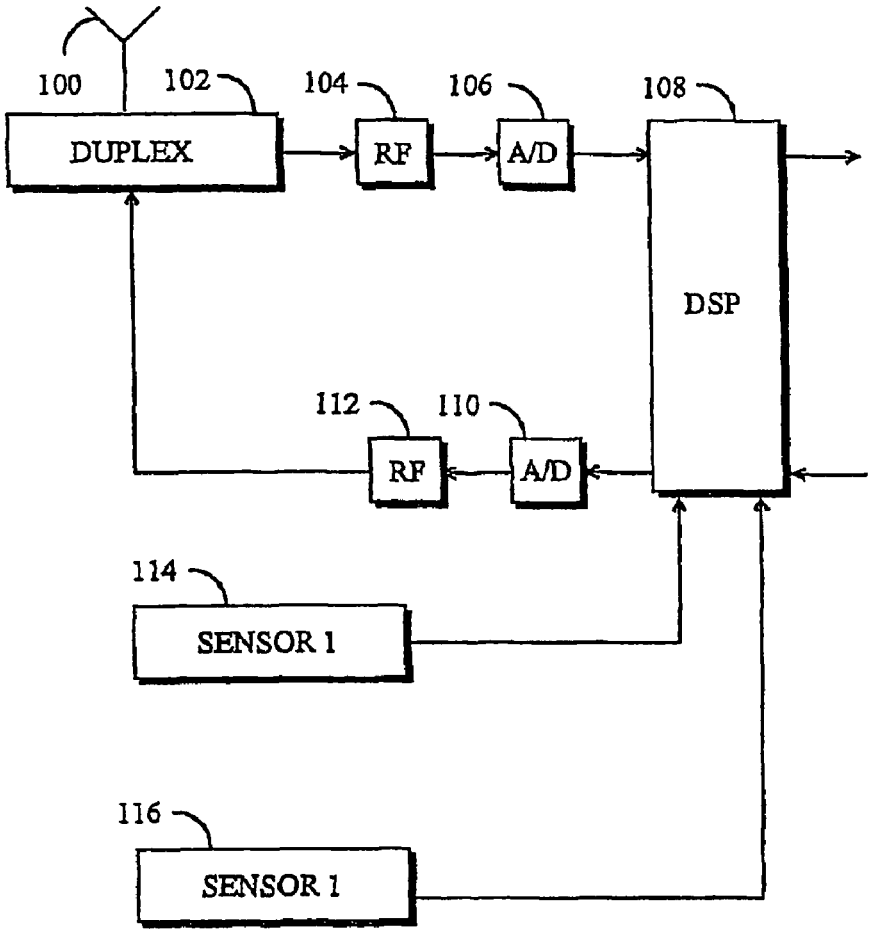
FIG. 2 is a block diagram illustrating a transceiver.

FIG. 2 is a block diagram illustrating a mobile transceiver. The transceiver comprises an antenna 100 for transmission and reception. When a signal is received, it propagates from the antenna 100 to a duplex filter 102, which separates receiving circuits from transmitting circuits. The duplex filter 102 passes the received signal to a radio frequency block 104 of the receiving side, where the received radio-frequency signal is converted into the base band. From the radio frequency block 104 the analogue baseband signal propagates to an analogue-digital converter 106, which converts the analogue signal into a digital one. From the AID converter 106 the digital signal further propagates to a signal processing block 108, where the signal can be filtered, decoded and demodulated, for example. From the signal processing block 108 the signal often propagates to other blocks of the transceiver, which are not relevant to the invention and are therefore not shown here.

When a signal is transmitted, it arrives in the signal processing block 108, where the signal to be transmitted can be filtered, encoded or modulated, for example, and propagates further to a digital-analogue converter 110, which converts the digital signal into an analogue one. The analogue signal is converted into a radio frequency signal in a mixer included in the radio frequency block 112. The radio frequency signal propagates to the duplex filter 102, which further guides the radio frequency signal to the antenna 100, which emits the signal into its environment as electromagnetic radiation.

The signal processing block 108 measures the impulse response in a manner known per se, for instance. In the present solution the measurement frequency of impulse response depends on the movement of the transceiver. The movement is measured by at least one acceleration sensor 114 to 116. The acceleration sensor is usually an electromechanic converter, which produces an electric signal corresponding to the acceleration at its output pole. The operation of the acceleration sensor is based e.g. on a piezoelectric crystal, where the change of charge distribution is comparable to the force directed at the crystal. Acceleration sensors are described in greater detail in Understanding Smart Sensors, Frank Randy, Artech House Inc., 1996 (ISBN 0-89006-824-0), which is incorporated herein by reference.

The movement can be measured in more than one dimension by using several acceleration sensors, which can be integrated into the same sensor. By using at least three acceleration sensors which are in the directions of different dimensions the terminal state can be measured three-dimensionally. The acceleration signal measured by the acceleration sensors 114 to 116 is fed into the digital signal processing block 108, where the measurement frequency of impulse response, for example, is controlled according to the acceleration information and/or the velocity calculated from the acceleration information. The higher the measured acceleration or the velocity is, the more frequently the impulse response is measured. The lower the measured acceleration or the velocity, the less frequently the impulse response is measured.

In addition to the acceleration or instead of it, the terminal velocity can be measured by integrating the acceleration. Mathematically expressed, the velocity v is obtained as an integral of acceleration a as follows:

$$v = \int_{t_0}^{t_1} a\,dt$$

where $t_0$ is the starting time of measurement and $t_1$ is the ending time of measurement, i.e. the time interval $t_1$ to $t_0$ is the measuring time window. The velocity v measurement can be expressed in discrete form as follows:

$$v = \sum_{i=1}^{M} a_i \Delta t_i$$

where M is the number of measuring moments in the measuring time window, $a_i$ is the acceleration at each measuring time and $\Delta t_i$ is the time between two measuring moments. In the solution described the measurement frequency of impulse response increases as the terminal velocity increases. Correspondingly, the measurement frequency of impulse response decreases as the terminal velocity decreases.

Since the mobile transceiver does not move all the time at a very high velocity on the boarder of the coverage area of highly loaded base stations, the power consumption of the mobile transceiver can be reduced considerably by decreasing the measurement frequency of impulse response. The power consumption can at most be reduced to less than 1/3000 of the power consumption in a situation where the mobile transceiver does not take its movement into account. In a subscriber terminal, the reduced power consumption means longer charging intervals of the battery both in the standby mode and in the talk mode. When the movement of the mobile transceiver requires the highest possible measurement frequency of impulse response, the measurement frequency can be e.g. 100 Hz. On the other hand, when the transceiver is at least nearly immobile, the impulse response can be measured at a frequency of 1 Hz, for example. According to the example described, the impulse response measurement frequency can thus be reduced 100-fold. The measurement frequencies given only exemplify the operation and give an idea of the influence of the present solution on the measurement frequency of impulse response. The solution described is limited neither to the above-mentioned measurement frequencies nor to the ratios of the measurement frequencies given. At its simplest the impulse response can be measured at two frequencies. In that case a low measurement frequency is used when the mobile transceiver is immobile or moves slowly (at the human walking pace, less than 10 km/h). Otherwise a high measurement frequency is used. It is not the measurement frequencies that are important but the fact that the low impulse response measurement frequency should be lower than the high impulse response measurement frequency.

The information on the impulse response is used e.g. in the following manner. The base station or base stations with which the terminal communicates over a data transmission connection are searched for by means of the impulse response measurement. The search is carried out by measuring the impulse response from one or more base stations and selecting at least one base station with the highest signal interference ratio SNR or the highest, signal noise ratio SNR. The impulse response measurement is used for updating the list of neighbouring base stations for a possible handover. The impulse response measurement is also employed for timing synchronization between the terminals and the base stations. In addition, the starting transmission power of the terminal is determined at the beginning of connection establishment by means of the impulse response measurement.

When the velocity of the mobile transceiver is measured by integrating acceleration, the velocity estimate formed can be used for controlling the transmission power of the mobile transceiver. In that case the step size of power control, for example, can be optimised. The step size of power control is the smallest change in power that can be made. This is explained in greater detail in T. Frantti, Fuzzy Power Control for Mobile Radio Systems, European Symposium on Applications of Intelligent Technologies, Aachen, Germany, 1997 and in A. J. Viterbi, CDMA—Principles of Spread Spectrum Communications, Addison Wesley, 1995, which are incorporated herein by reference. By means of velocity the threshold for power control can also be changed so that as the velocity exceeds a predetermined velocity threshold, the power is controlled differently than when the velocity is below the predetermined limit. One or more such thresholds may be used. Instead of velocity thresholds, the power control can also be changed slidingly, i.e. constantly according to the velocity. Furthermore, the velocity can be used for determining the measurement accuracy of impulse response, i.e. for optimizing the length of the FIR filter (Finite Impulse Response).

Figure 3:
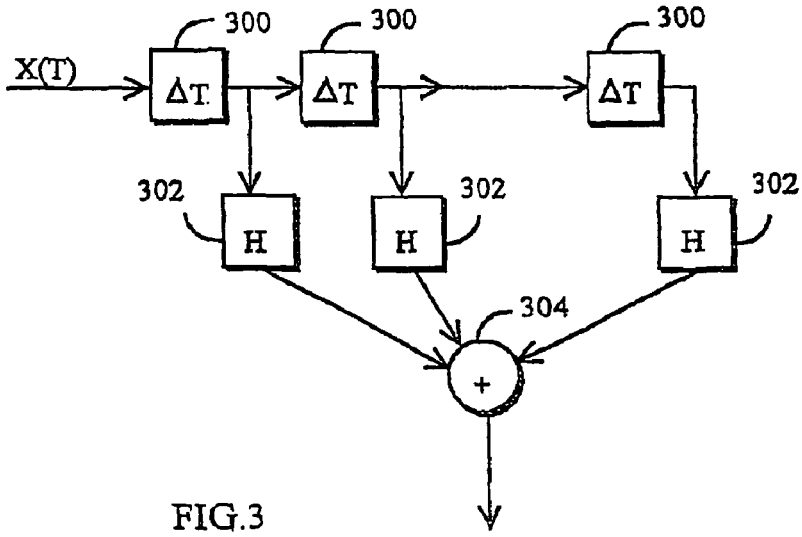
FIG. 3 is a block diagram of an FIR filter

The FIR filter will now be described in greater detail by means of FIG. 3. The FIR filter comprises delay means 300, taps 302 and an adder 304. The taps 302 of the FIR filter are weighting coefficients of the impulse response. When the coefficients are correct, the distortion caused by the channel decreases to its minimum. At their simplest the tap coefficients are either ones or zeroes. An incoming signal x(t) is delayed in each delay means 300 and the delayed signals are added together in the adder 304. At its simplest the FIR filter is a transfer register where the content of each register element is added, weighted by a tap coefficient. In the time plane the output y(t) of the FIR filter can be expressed by the formula $$y(t) = \sum_{k=0}^{M-1} h(k)x(t - k\Delta t)$$

where h(k) is the tap coefficient of impulse response, k is an index from 0 M to 1, M is the number of taps, t is the time and x(t) is the signal value at the moment t, y(t) is the signal estimate of the received signal.

When the channel distortion is not very great, accurate information on impulse response is not needed. In that case it is not necessary to measure or define all M taps of the FIR filter but it is sufficient that P taps, where P is smaller than M, i.e. P<M, are used for defining the signal estimate. Undefined taps receive the value 0.

When the velocity of the mobile transceiver is measured, reliable information can also be formed from the influence of the Doppler phenomenon on the frequency shift of the signal received. The frequency shift $\Delta f_i$ caused by the Doppler phenomenon to the component i of one signal is expressed mathematically as follows:

$$\Delta f_i = \frac{v}{\lambda}\cos\alpha_i,$$

where i is the index of the signal component, $\lambda$ is the signal wave length, v is the transceiver velocity and $\alpha_i$ is the angle between the direction of movement of the transceiver and the direction of the arriving signal. The frequency shift $\Delta f$ of the received signal also changes the duration of the received symbol, which should be taken into account in data transmission. In transmission the symbol duration can be either increased or reduced according to the influence of the Doppler phenomenon.

The received signal should be sampled (block 106 in FIG. 2) at the Nyquist frequency in proportion to the greatest frequency shift $\Delta f$ caused by the Doppler phenomenon. In the solution shown the sampling frequency can be changed according to the frequency shift $\Delta f$. The sampling frequency is increased when the frequency shift increases and reduced when the frequency shift decreases.

When all K signal components are gone through, i being 1 to K (i=1, . . . , K), where K is the desired number of signal components, it is possible to form the power density spectrum of Doppler spread. If we assume that different signal components have scattered isotropically and arrive at the receiver spread equally in all directions between [0°, 360°], we obtain a U-shaped power density curve. The bandwidth $f_D$ of Doppler spread can be estimated from the power density spectrum or directly from the greatest frequency shift. The inverse of the bandwidth provides delay spread $T_C$, $T_C=1/(2\cdot f_d)$, where the band width $f_D$ is $f_D=(v/c)\cdot f_C$ and $f_C$ is the frequency of the carrier wave. Coherence time, i.e. the time when channel changes are small and the symbol transmitted on the channel contains hardly any channel interference, can be determined from the delay spread or directly from the bandwidth of Doppler spread. Doppler spread is Doppler_spread=$2\cdot(v/c)\cdot f_C=\beta_d$. The coherence time $T_C=1/\beta_d$. If the symbol duration is shorter than the coherence time, the channel is a slowly fading channel. If the symbol duration is longer than the coherence time, the channel is a fast fading channel. When it is detected that the coherence time $T_C$ changes due to the Doppler phenomenon, source coding, channel coding, power control or data transmission rate can be changed in the solution shown so that the influence of the Doppler phenomenon is reduced or eliminated. The ratio of the coherence time to the symbol duration defines the channel as a slow fading or a fast fading channel.

Figure 4A:
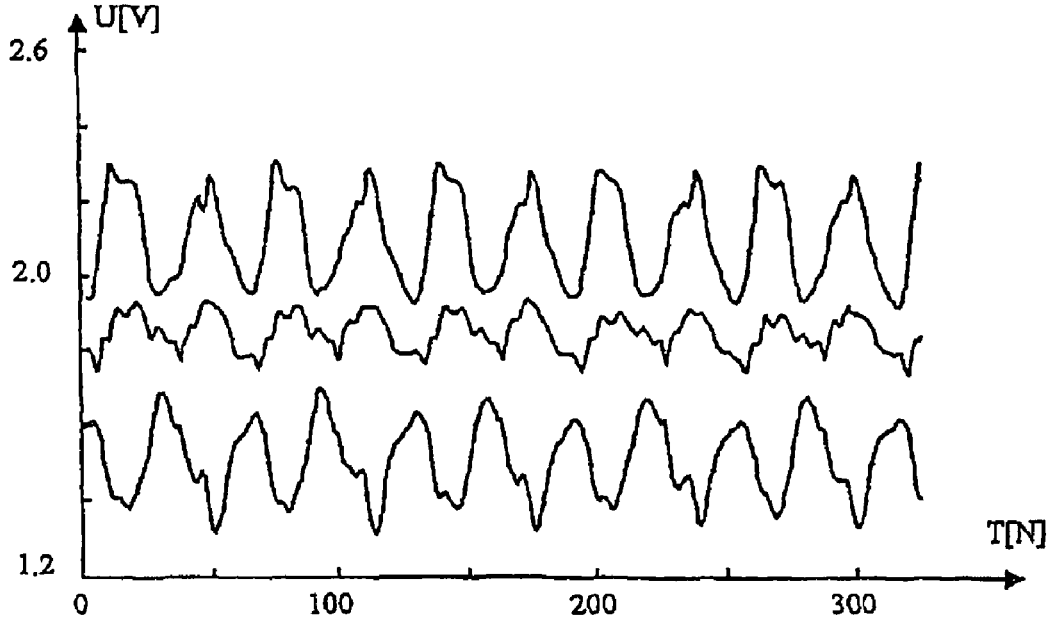
FIG. 4A illustrates accelerations caused by walking in the direction of different dimensions.
Figure 4B:
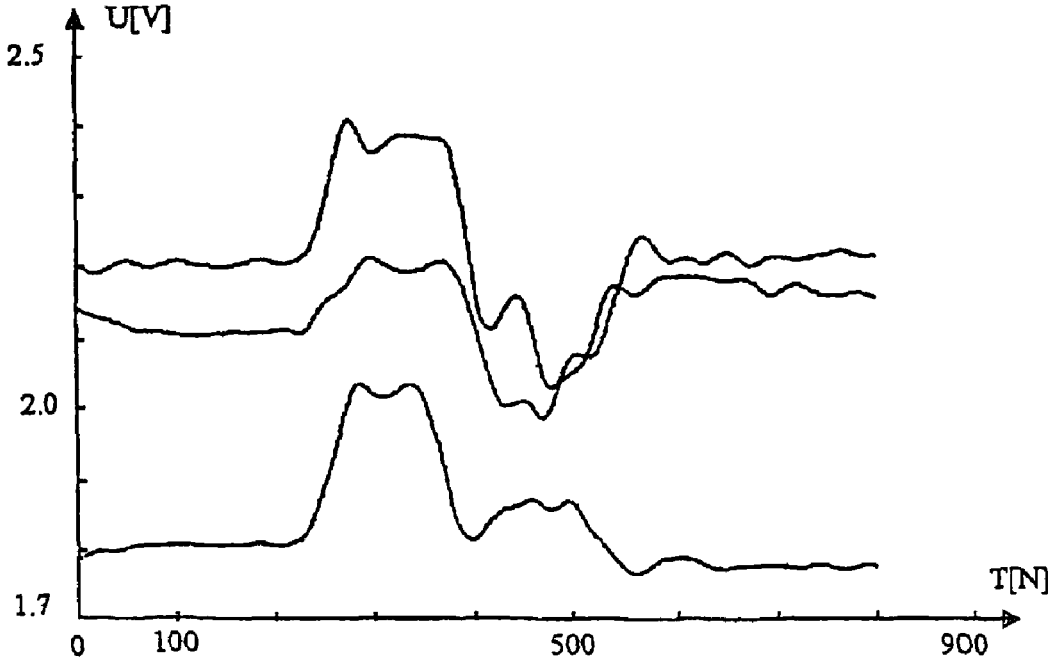
FIG. 4B illustrates accelerations when one answers a call.

Context identification related to each movement can also be carried out even by one acceleration sensor, but preferably by several acceleration sensors. This is illustrated in FIGS. 4A and 4B, where the vertical axis represents the output voltage U corresponding to the sensor acceleration in volts V and the horizontal axis represents the sample number N corresponding to the time T. The same sampling frequency is used both in FIG. 4A and in FIG. 4B. By means of context identification it is possible to distinguish immobility, walking, running and sitting in the car, etc. from one another on the basis of the behaviour of acceleration signals generated in the above-mentioned states. FIG. 4A shows the acceleration curves of three sensors, which measure in different directions, as a function of time when the user steps at the usual walking rate, i.e. 50 samples on the horizontal axis correspond to approximately one second. The sensors are attached to a terminal carried by a user who walks. Walking and running generate regular detectable accelerations in the up and down directions. Walking and running can be distinguished from the other states and from each other on the basis of the amplitude and the frequency of the acceleration signal. When the user is immobile, usually hardly any acceleration occurs or acceleration is caused e.g. by the fact that the user turns, turns his head, etc. which can be detected and distinguished from the actual movement with respect to the ground surface. FIG. 4B shows a situation where the user answers the phone used as the terminal. The phone is lifted to the ear, which causes typical acceleration curves in the direction of different dimensions. In the case of a car, the terminal velocity can be determined e.g. from start, stop and curve accelerations. Context identification is described in greater detail in E. Tuulari, Context Aware Hand Held Devices, VTT Publications, 200, which is incorporated herein by reference.

Acceleration sensors can be integrated into terminal circuits or frame and the acceleration information can be processed by the processor in the terminal or by a separate processor in the signal processing block (FIG. 1, block 108).

Even though the invention was described above with reference to the example according to the accompanying drawings, it is clear that the invention is not limited thereto but may be modified in various ways within the inventive concept disclosed in the appended claims.

The invention claimed is:

1. A method of detecting movement of a mobile transceiver in a radio system[, which comprises at least one base station (1) and terminals (2-4)], *the method* comprising [the steps of]:

measuring [the] *an* acceleration of the mobile transceiver [(2-4)] by at least one acceleration sensor [(114-116)] and determining [the] *a* velocity of the mobile transceiver by integrating the acceleration, and determining [the] *a* frequency shift caused by [the] *a* Doppler phenomenon at [the] *a* frequency used for data transmission from the velocity of the mobile transceiver [(2-4).] in order to take [the] movement of the mobile transceiver into account in [the] *at least one* operation [of the radio system].

2. The method according to claim 1, further comprising [the step of measuring the acceleration of the mobile transceiver by at least one acceleration sensor (114-116) and] determining the velocity of the mobile transceiver from [the] acceleration information by means of context identification.

3. The method according to claim 1, [by] further comprising [the step of] changing [the] *a* sampling frequency in reception according to [the] *a* magnitude of [the] *a Doppler* frequency shift *associated with the velocity*.

4. The method according to claim [1] *3*, further comprising [the step of] determining [the] *a* coherence time related to the Doppler [phenomenon] *frequency shift* from the velocity of the mobile transceiver [(2-4)].

5. The method according to claim 4, further comprising [the step of] changing at least one of the following factors that influence data transmission as the coherence time changes: source coding, channel coding and data transmission rate.

6. The method according to claim 1, further comprising [the step of] taking the velocity of the mobile transceiver

[(2-4)] into account when [the] *a* transmission power of the mobile transceiver is adjusted.

7. The method according to claim 1, further comprising [the step of] determining [the] *a* measurement frequency of impulse response from the velocity of the mobile transceiver [(2-4)].

8. The method according to claim 1, further comprising [the step of] optimizing [the] *a* measuring accuracy of impulse response according to the velocity of the mobile transceiver [(2-4)].

9. The method according to claim 1, further comprising [the step of] using at least three acceleration sensors [(114-116)] to measure the movement of the mobile transceiver [(2-4)] in three different spatial dimensions.

10. The method according to claim 1, further comprising [the step of] measuring the movement of the mobile transceiver [(2-4)] at least in two dimensions by at least two acceleration sensors [(114-116)].

11. The method according to claim 1, wherein the mobile transceiver [(2-4)] is a mobile station.

12. A mobile transceiver in a radio system, [which comprises at least one base station and terminals,] the mobile transceiver [(2-4)] being arranged and adapted to[,]:

measure [the] *an* acceleration of the mobile transceiver [(2-4)] with at least one acceleration sensor [(114-116)] and determine [the] *a* velocity of the mobile transceiver [(2-4)] by integrating the acceleration, and determine [the] frequency shift caused by [the] *a* Doppler phenomenon at [the] *a* frequency used for data transmission from the velocity of the mobile transceiver [(2-4),] in order to take [the] movement of the mobile transceiver [(2-4)] into account in [the] *at least one* operation [of the radio system].

13. The transceiver according to claim 12, wherein the mobile transceiver [(2-4)] is arranged to [measure the acceleration of the mobile transceiver (2-4) with at least one acceleration sensor (114-116) and] determine the velocity of the mobile transceiver [(2-4)] from [the] acceleration information by means of context identification.

14. The transceiver according to claim 12, wherein the mobile transceiver [(2-4)] is arranged to change [the] *a* sampling frequency in reception according to the magnitude of [the] *a Doppler* frequency shift *associated with the velocity*.

15. The transceiver according to claim 14, wherein the mobile transceiver [(2-4)] comprises at least three acceleration sensors [(114-116)] for measuring the movement of the mobile transceiver [(2-4)] in three different spatial dimensions.

16. The transceiver according to claim 14, wherein the mobile transceiver [(2-4)] is a mobile station.

17. The transceiver according to claim [12] *14*, wherein the mobile transceiver [(2-4)] is arranged to determine [the] *a* coherence time related to the Doppler [phenomenon] *frequency shift* from the velocity of the mobile transceiver [(2-4)].

18. The transceiver according to claim 17, wherein the mobile transceiver [(2-4)] is arranged to change at least one of the following factors that influence data transmission as the coherence time changes: source coding, channel coding and data transmission rate.

19. The transceiver according to claim 12, wherein the mobile transceiver [(2-4)] is arranged to determine [the] *a* measuring frequency of impulse response from the velocity of the mobile transceiver [(2-4)].

20. The transceiver according to claim 12, wherein the mobile transceiver [(2-4)] is arranged to take the velocity of the mobile transceiver [(2-4)] into account when [the] *a* transmission power of the mobile transceiver [(2-4)] is adjusted.

21. The transceiver according to claim 12, wherein the mobile transceiver [(2-4)] is arranged to optimize [the] *a* measurement accuracy of impulse response according to the velocity of the mobile transceiver [(2-4)].

22. The transceiver according to claim 12, wherein the mobile transceiver [(2-4)] is arranged to measure the movement of the mobile transceiver [(2-4)] in at least two dimensions by at least two acceleration sensors [(114-116)].

*23. The transceiver of claim 12, further comprising a finite impulse response (FIR) filter.*

*24. The transceiver of claim 23, wherein a length of the FIR filter is altered based on the velocity of the mobile transceiver.*

*25. The transceiver of claim 23, wherein the FIR filter comprises a number M of taps.*

*26. The transceiver of claim 25, wherein a number P of taps, $P \leqq M$, are used to determine an output of the FIR filter, where P is determined based on the velocity of the mobile transceiver.*

*27. The transceiver of claim 12, wherein the transceiver further comprises sampling means configured to take a Doppler frequency shift into account, wherein the Doppler frequency shift is based on the velocity of the mobile transceiver.*

*28. The transceiver of claim 27, wherein the sampling means are configured to change a sampling frequency based on the Doppler frequency shift.*

*29. The transceiver of claim 27, wherein the sampling means comprises an analogue to digital converter.*

*30. The transceiver of claim 27, further comprising adjustment means for adjusting a characteristic of the transceiver based on the Doppler frequency shift.*

*31. The transceiver of claim 30, wherein the characteristic of the transceiver is a source coding, a channel coding, a power control, or a data transmission rate of the transceiver.*

*32. The transceiver of claim 27, wherein the sampling means are configured to determine a symbol duration of a channel and a coherence time of the channel.*

*33. The transceiver of claim 32, wherein the sampling means are configured to determine a ratio of the coherence time of the channel to the symbol duration of the channel.*

*34. The transceiver of claim 33, further comprising characterizing the channel as a slowly fading channel if the ratio is greater than 1.*

*35. The transceiver of claim 33, further comprising characterizing the channel as a fast fading channel if the ratio is less than 1.*

*36. A method of operating a mobile transceiver in a radio system, the method comprising;*

*determining a velocity of a mobile transceiver by integrating an acceleration of the mobile transceiver;*

*determining a Doppler frequency shift at a frequency used for data transmission from the velocity of the mobile transceiver; and*

*adjusting at least one operating characteristic based on at least one of the velocity or the Doppler frequency shift.*

*37. The method of claim 36, wherein the at least one operating characteristic is a sampling rate of a signal received by the mobile transceiver.*

*38. The method of claim 36, wherein the at least one operating characteristic is a symbol duration.*

*39. The method of claim 36, wherein the at least one operating characteristic is a rate at which a channel impulse is determined.*

*40. The method of claim 36, wherein the at least one operating characteristic is a length of a finite impulse response (FIR) filter.*

*41. The method of claim 36, wherein the at least one operating characteristic is a source coding, a channel coding, a power control, or a data transmission rate of the transceiver.*

*42. A system, comprising:*

*a radio system, comprising at least one base station; and*

*a mobile transceiver, comprising:*

*an acceleration sensor, configured to measure an acceleration of the mobile transceiver,*

*a digital processing block, configured to determine a velocity of the mobile transceiver by integrating the acceleration of the mobile transceiver and to determine, from the velocity, a Doppler frequency shift at a frequency used for data transmission, and*

*a finite impulse response (FIR) filter, configured to be adjusted based on at least one of the velocity of the mobile transceiver or the Doppler frequency shift.*

* * * * *

UNITED STATES PATENT AND TRADEMARK OFFICE

CERTIFICATE OF CORRECTION

PATENT NO. : RE43,543 E
APPLICATION NO. : 12/218972
DATED : July 24, 2012
INVENTOR(S) : Frantti et al.

It is certified that error appears in the above-identified patent and that said Letters Patent is hereby corrected as shown below:

On the Title Page, in Item (56), under "FOREIGN PATENT DOCUMENTS", in Column 2, Line 1, delete "EP 0 812 119 12/1997".

On the Title Page, in Item (56), under "FOREIGN PATENT DOCUMENTS", in Column 2, Line 3, delete "EP 0 833 537 4/1998".

On the Title Page, in Item (56), under "FOREIGN PATENT DOCUMENTS", in Column 2, Line 5, delete "GB 2 183 117 5/1987".

On Title Page 2, in Item (56), under "FOREIGN PATENT DOCUMENTS", in Column 1, Line 2, delete "GB 2 305 825 4/1997".

On Title Page 2, in Item (56), under "OTHER PUBLICATIONS", in Column 2, Line 15, delete "Randy Frank, Understanding Smart Sensors, 1996, Artech House.".

On Title Page 2, in Item (56), under "OTHER PUBLICATIONS", in Column 2, Lines 16-18, delete "Tapio Frantti, "Fuzzy Power Control for Mobile Radio Systems," European Symposium on Applications of Intelligent Technologies, Aachen, Germany, 1997, pp. 1-6.".

In the Specifications:

In Column 2, Line 3, delete "filter" and insert -- filter, --, therefor.

In Column 2, Line 33, delete "AID" and insert -- A/D --, therefor.

In Column 3, Line 15, delete "a as" and insert -- as --, therefor.

In Column 2, Line 3, delete "highest," and insert -- highest --, therefor.

Signed and Sealed this
Fourteenth Day of May, 2013

Teresa Stanek Rea
*Acting Director of the United States Patent and Trademark Office*

In the Claims:

In Column 7, Line 37, in Claim 13, delete “with” and insert -- with the --, therefor.

In Column 8, Line 49, in Claim 36, delete “comprising;” and insert -- comprising: --, therefor.